Feb. 28, 1961　　　A. P. CLARK　　　2,972,961
HYDROSTATIC LUBRICATING APPARATUS
Filed Sept. 18, 1957　　　6 Sheets-Sheet 1

INVENTOR
ALBERT P. CLARK
BY
ATTORNEYS

Feb. 28, 1961 — A. P. CLARK — 2,972,961
HYDROSTATIC LUBRICATING APPARATUS
Filed Sept. 18, 1957 — 6 Sheets-Sheet 2

INVENTOR
ALBERT P. CLARK
ATTORNEYS

Feb. 28, 1961 A. P. CLARK 2,972,961
HYDROSTATIC LUBRICATING APPARATUS
Filed Sept. 18, 1957 6 Sheets-Sheet 3
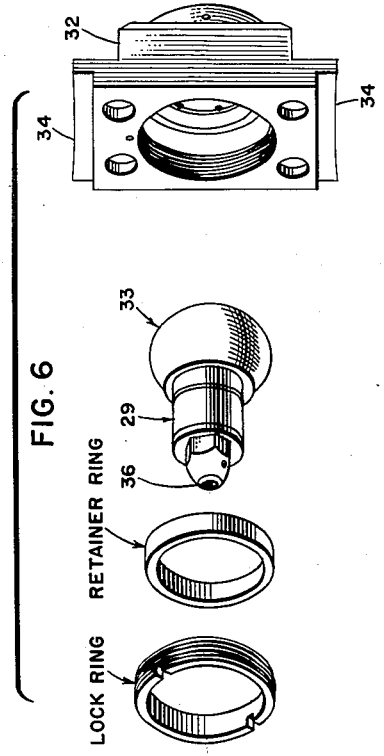
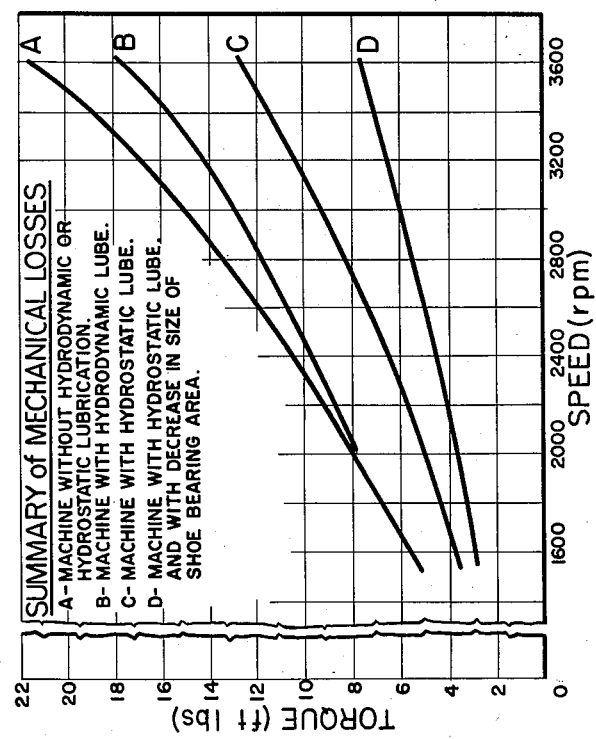
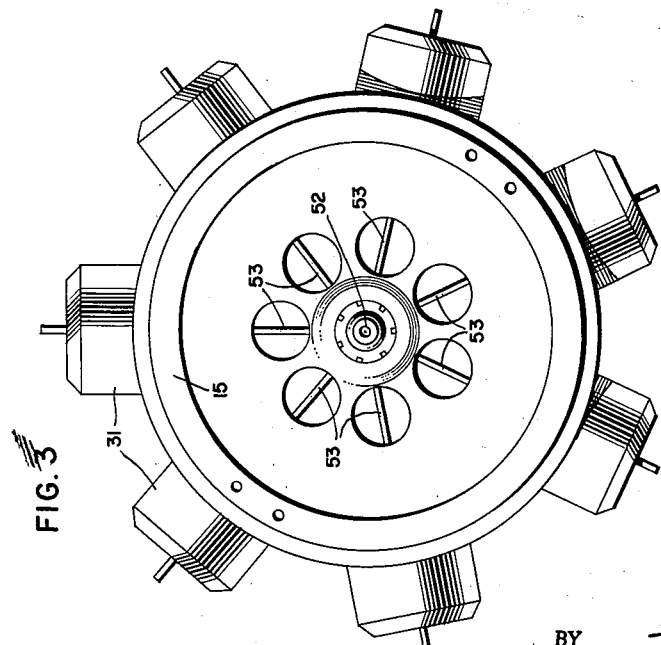
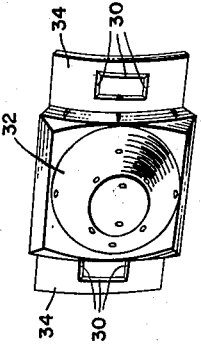
INVENTOR
ALBERT P. CLARK
BY
ATTORNEYS Feb. 28, 1961  A. P. CLARK  2,972,961
HYDROSTATIC LUBRICATING APPARATUS
Filed Sept. 18, 1957  6 Sheets-Sheet 4
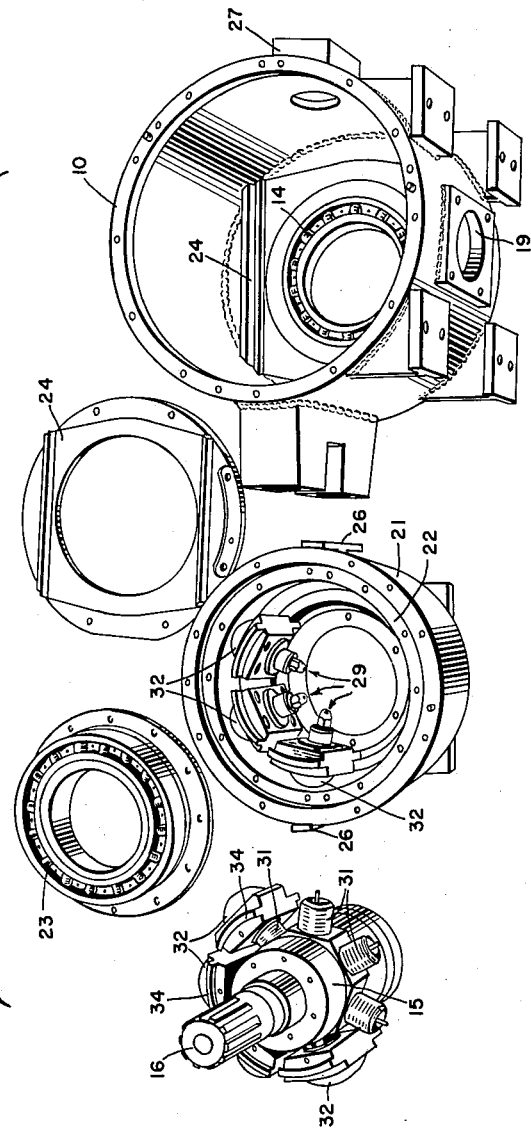
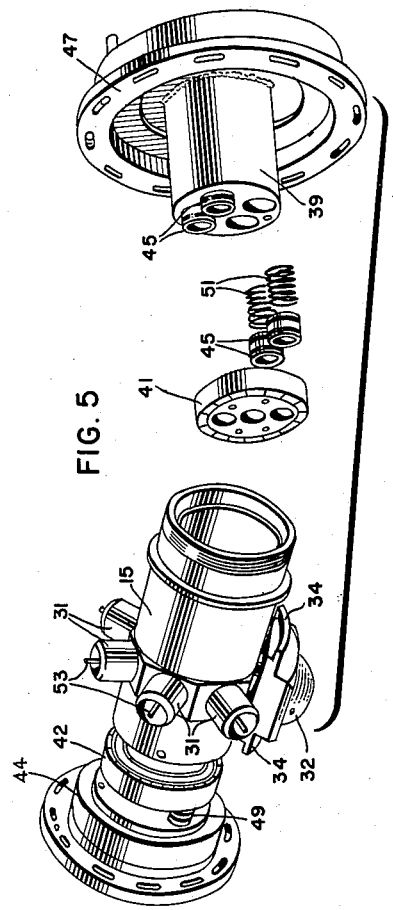
INVENTOR
ALBERT P. CLARK
BY
ATTORNEYS Feb. 28, 1961                 A. P. CLARK                 2,972,961

HYDROSTATIC LUBRICATING APPARATUS

Filed Sept. 18, 1957                             6 Sheets-Sheet 5

INVENTOR
ALBERT P. CLARK

BY

ATTORNEYS

Feb. 28, 1961 A. P. CLARK 2,972,961
HYDROSTATIC LUBRICATING APPARATUS
Filed Sept. 18, 1957 6 Sheets-Sheet 6
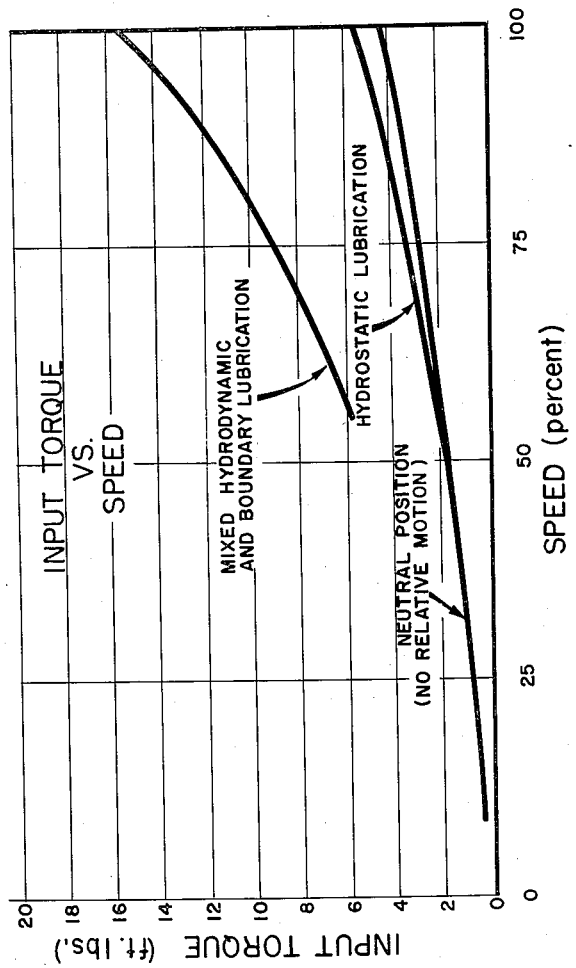
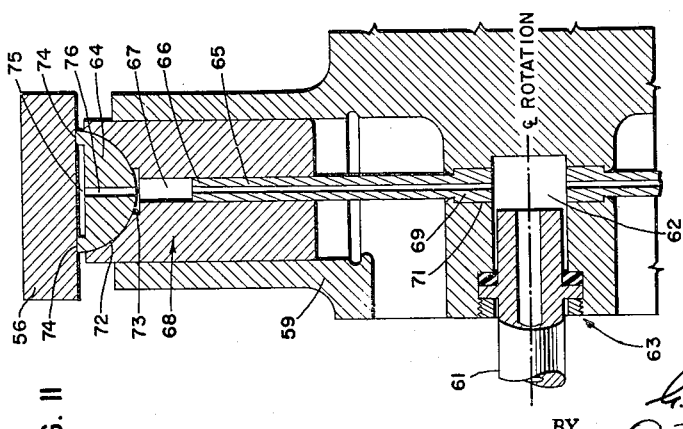
INVENTOR
ALBERT P. CLARK
BY
ATTORNEYS United States Patent Office 2,972,961
Patented Feb. 28, 1961

2,972,961
HYDROSTATIC LUBRICATING APPARATUS

Albert P. Clark, West Chester, Pa., assignor, by mesne assignments, to the United States of America as represented by the Secretary of the Navy Filed Sept. 18, 1957, Ser. No. 684,825

3 Claims. (Cl. 103—161)

The present invention relates broadly to high-speed fluid motors and pumps of the positive displacement type, and more specifically to means for providing hydrostatic lubrication and for hydrostatically carrying those forces which are independent of pump pressure such, for example, as centrifugal forces created during high-speed movement of the parts of the machine. These features are accomplished by supplying pressure in a novel fashion from an external source independent of the system pressure.

The type of machine in which the present invention is particularly well adapted for use is characterized as being provided with a rotatable cylinder barrel, pistons and cylinders radially extending into the cylinder barrel from the circumferential periphery thereof and a freewheeling thrust member or reaction ring arranged around the cylinder barrel in engagement with the outer ends of the pistons. The pistons are reciprocated with a pumping action in timed relation with the rotation of the cylinder barrel. The thrust member is eccentrically arranged with respect to the cylinder barrel when the machine is performing useful work.

When such a machine is driven mechanically it will function as a pump to pump a working fluid from a low pressure source into a high pressure outlet line, and when it is supplied with relatively high pressurized liquid it will function as a motor. In the description which follows, the machine will be referred to as a pump in order to simplify the explanation of the invention. However, it is intended that the invention be in no way limited by describing it as a pump and it is to be emphasized that the invention may be employed with equal advantages when the machine is functioning as a motor.

During one-half revolution of the cylinder barrel each piston of the pump will move outwardly and draw liquid into its cylinder. During the other half revolution of the cylinder barrel the liquid will be forced inwardly in response to the respective pistons being moved inwardly by the thrust member and the liquid is expelled from the cylinder of the inwardly moving pistons.

When the pistons move inwardly, pumping forces are transmitted from the thrust member through the inwardly moving pistons to the liquid in the cylinders of these pistons. The cylinder barrel is acted upon by these forces and they tend to move it at right angles to its axis of rotation.

An attempt which has been made to solve the problem of carrying the centrifugal load of the piston thrust has been to provide a pad through which the thrust is carried, the pad being constructed and arranged to tilt so that the misalignment between the piston and the normal to the reacting surface of the thrust member is compensated. However, because of the kinematics of the mechanisms, these pads must also move linearly with respect to the reacting or thrust member and, therefore, the pads pose a difficult bearing problem in and of themselves.

Another attempt to solve the problem of carrying piston thrust has been by the use of the pressure developed by the pump to establish a hydrostatic balance with respect to the thrust on the reacting member. As in other prior attempts to solve this problem, certain disadvantages exist in this solution. One of these disadvantages resides in the fact that the developed pressure is of a cyclic nature, this pressure being available for utilization during only one half of a revolution of the cylinder barrel. Therefore, the pressure cannot be used effectively to carry forces which are of a continuous nature and are independent of pump pressure such, for example, as centrifugal forces applied against the reaction ring. It is this problem of carrying such large independent forces, during high-speed operation, to which the present invention pertains.

Accordingly, one object of the present invention resides in the provision of means in positive displacement pumps for carrying forces which are independent of pump pressure such, for example, as centrifugal forces.

Another object of the present invention is to provide means for carrying such independent and constant forces by supplying pressure from an external source which is independent of the system pressure.

Still another object of the present invention is to provide a pressurized fluid from an independent source and to feed such fluid through the pistons of a piston-type positive displacement machine to lubricate the pads as the latter rotate against the ring.

A further object is to provide a high-speed positive displacement hydraulic machine of such a size and weight as to be suitable as a power drive for training gun or launcher mounts with improved performance, particularly when tracking high-speed targets.

An additional object of the present invention resides in the provision of a mechanism capable of accomplishing the foregoing objects and which is rugged and inexpensive in construction.

Other objects and many of the attendant advantages of this invention will be readily appreciated as the same becomes better understood by reference to the following detailed description when considered in connection with the accompanying drawings wherein:

Fig. 3 is an end view of the cylinder barrel showing the valve face, hydrostatic tubes and inlet manifold;

Fig. 4 is an exploded view of the rotating group, reaction ring housing and main housing of the pump;

Fig. 5 is an exploded view of the cylinder barrel and valving group of the pump;

Fig. 6 is an exploded view of one of the piston and shoe assemblies of the pump;

Fig. 7 is an outer perspective view of one of the shoes and discloses the grooves or slots for establishing hydrostatic lubrication;

Fig. 8 is a graph illustrating torque losses in ft.-lbs. for various speeds of operation in r.p.m. and illustrating the high efficiency of the machine constructed in accordance with the first embodiment of the invention;

Fig. 11 is an enlarged vertical section taken through one cylinder barrel of a machine constructed in accordance with another embodiment of the invention and illustrates the piston in its somewhat extended position; and Fig. 12 is a graph on which input torque is plotted against speed and illustrates a comparison between the operational characteristics of a pump constructed in accordance with the first embodiment of the present invention as compared with tests on substantially the same general type of pump but which did not include the improvements resulting from a practice of the present invention and in which mixed hydrodynamic and boundary lubrication was employed, the lower curve representing the neutral condition of the pump in which there is no rotative motion between the pad and the reacting member.

Before proceeding with the detailed description the invention may be broadly described as providing apparatus for establishing hydrostatic lubrication in a piston-type positive displacement mechanism. The pistons, which may be of the bronze sleeve type having a nickel-steel core, are provided with shoes for engagement with an eccentrically mounted ring as the cylinder barrel, in which the pistons reciprocate, is rotated. Fluid from an outside source and under pressure is fed into the pistons to lubricate the pads as the ring rotates relative thereto.

Figure 1:
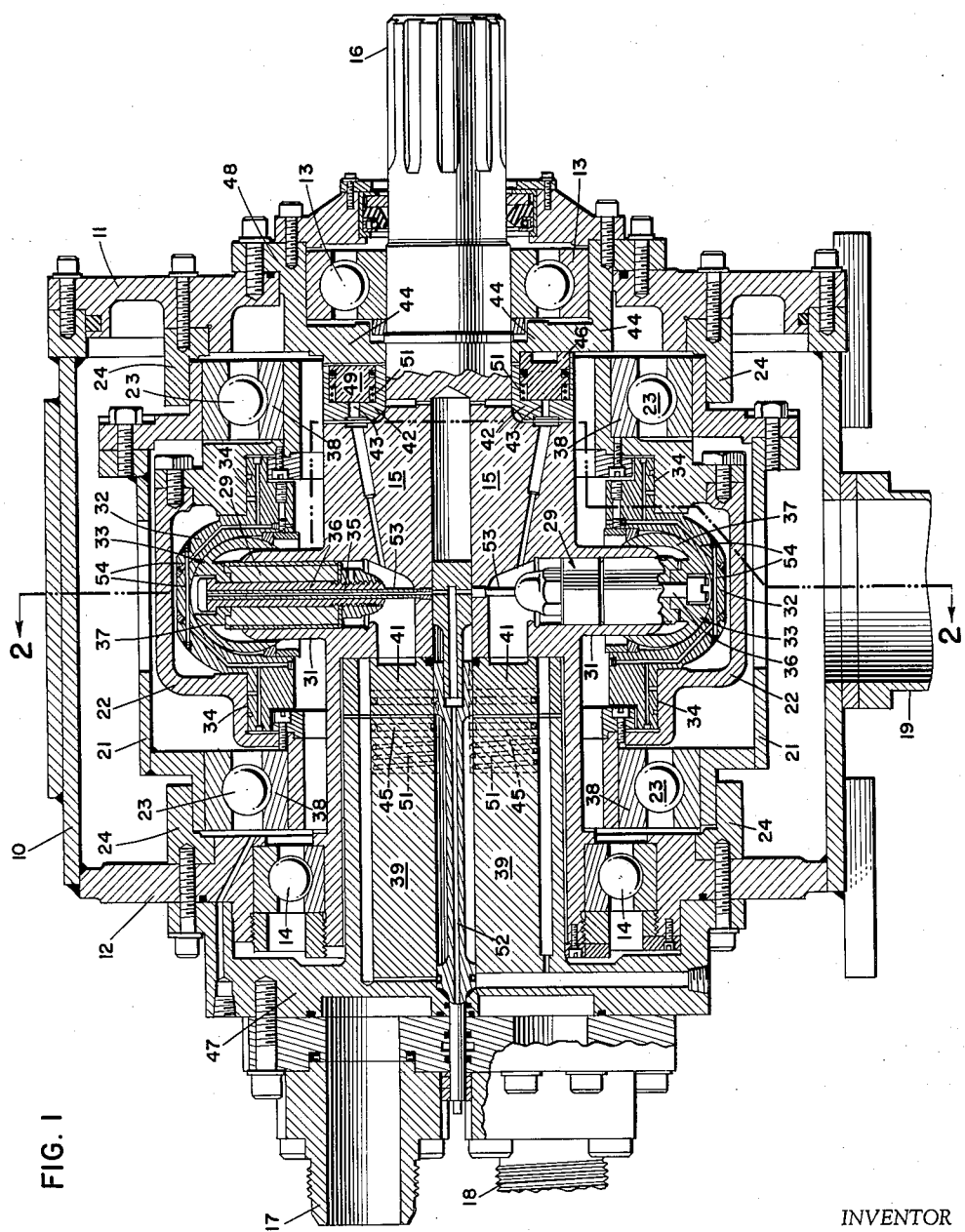
Fig. 1 is a vertical sectional view of one embodiment of the present invention taken along the longitudinal axis of the pump.
Figure 2:
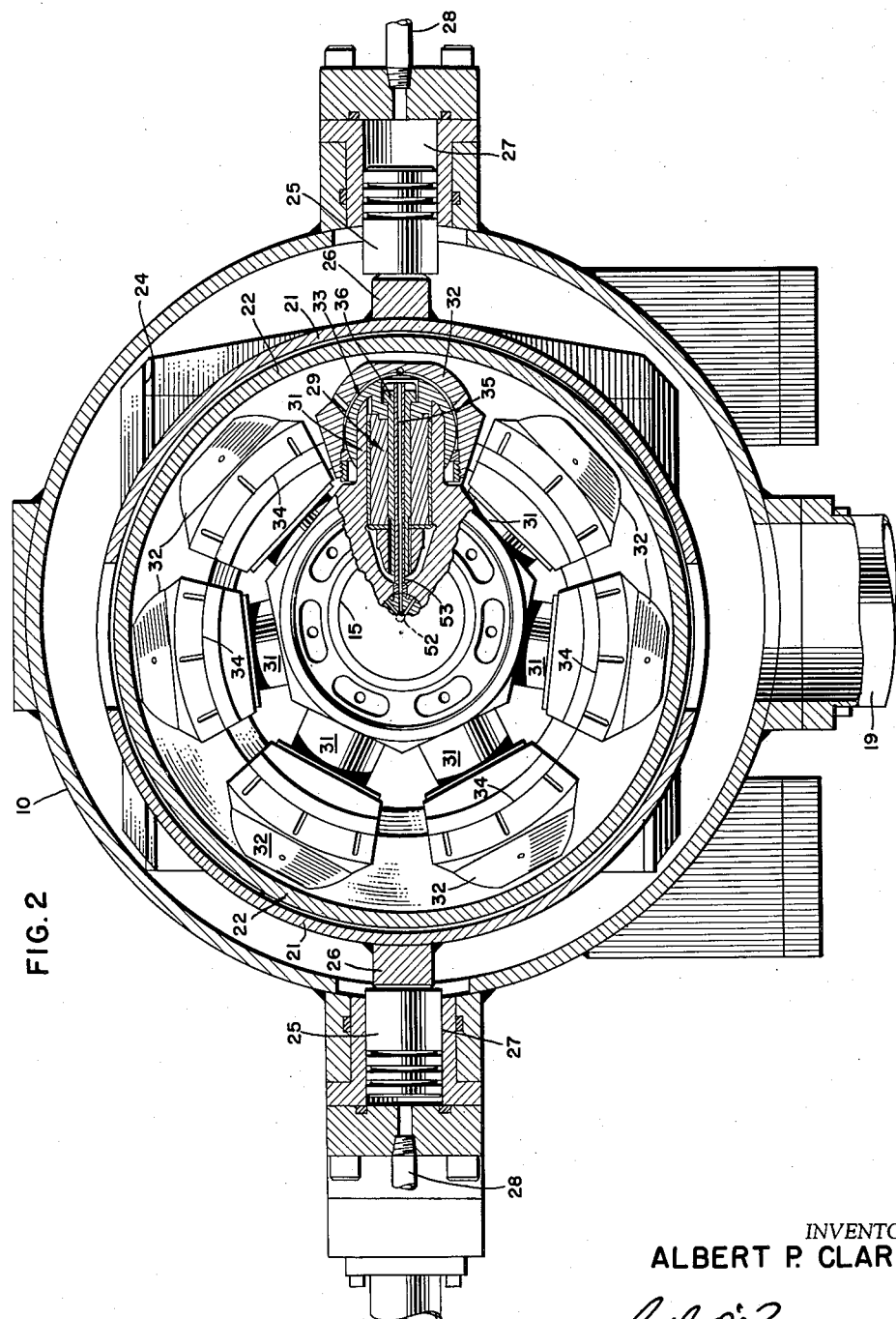
Fig. 2 is a transverse view of the first embodiment of the machine, partly in vertical section, as viewed from a line substantially corresponding to section line 2—2 of Fig. 1.

Referring now to the drawings and particularly to Figs. 1 and 2 thereof it will be noted that the pump is provided with an outer casing 10 and end caps 11 and 12. End caps 11 and 12 generally enclose bearings 13 and 14, respectively, for rotational support of the cylindrical barrel 15 and its drive shaft portion 16. End cap 12 supports fluid low pressure inlet and high pressure outlet nipples 17 and 18, respectively. The bottom side of casing 10 is provided with a drain line 19. An inner casing or reaction ring housing 21, which houses the reaction ring 22 and rotatably supports the latter on bearings 23, is slidably carried at each end thereof on transversely extending guideways 24. Thus, it will be apparent that the reaction ring 22 may be moved transversely relative to the cylinder barrel 15 so as to place the longitudinal axes of the cylinder barrel and reaction ring in eccentric relationship to one another, the eccentricity of the reaction ring relative to the cylinder barrel varying in accordance with the extent of transverse movement of the former relative to the latter. For this purpose, diametrically disposed stroking pistons 25 are in engagement with the inner casing 21 by means of reinforcement bars 26, these pistons being reciprocably carried within cylinders 27 connected by means of conduit 28 to a suitable source of pressurized fluid, not shown. The cylinder barrel 15 carries therewithin a plurality of pistons 29, each being slidably retained in radial relationship relative to the longitudinal axis of the cylinder barrel within a cylinder 31.

It will be noted that each piston 29 is connected to a hat-shaped shoe 32 by means of a ball-socket connection 33. By the employment of the hat-shaped shoe, a large bearing surface 34 is provided to carry the high centrifugal loads on the shoes. Also, by the employment of the hat-shaped shoe, the line of action of the frictional force between the shoe and the reaction ring passes through the center of the ball-socket joint thereby eliminating the possibility of frictional forces which tend to cause a tilting of the shoe about the socket connection.

The spherical concave bearing surfaces at the ball-socket connection depend on hydrostatic lubrication to compensate for the force on it due to the centrifugal force on the piston. Broadly stated, this is achieved by pumping liquid through small bore 35 of tube 53 which is received in a bore drilled through bolt 36 which connects each ball 37 to its respective piston.

The reaction ring 22, supported by the inner races 38 of the reaction ring bearings 23 is freewheeling. The bearings 23 are carried in the reaction ring housing 21.

In order to properly regulate fluid flow to and from each cylinder 31 a valve block 39 is provided. A face valve or valve block 41 is used as a working valve and is opposed by a dummy valve block 42 on the opposite side of the cylinder barrel. The ports 43 and contact annulus 44 on the dummy valve block are equal to those on the working valve block so that there is little net thrust on the cylinder barrel. Each bronze block 41 and 42 floats axially and is free to tilt, but is centered by a plurality of nipples 45 or a plurality of grooved plugs 46 and compensating plugs 49, respectively, as the case may be, and engaging the stationary members 47 and 48 substantially as shown.

Small differential areas acted on by the working pressures force the valve blocks toward the rotor faces. In this way a sealing force is provided at all times, free movement accommodating for deflection, wear and expansions.

The periodic rocking couple imposed on each valve block by commutation was reduced by compensating plugs 49. Springs 51 are provided for exerting on each valve block the force required for resisting external shock when the machine is operating at low pressure. These springs also insure contact of the valve blocks with the cylinder barrel when the machine is not in use.

Cooling oil to the ball bearings may be supplied by an external source through individual jets to each bearing. Lubrication of the shoe bearings is accomplished by drilling radial holes through the rotor.

In order to establish hydrostatic lubrication of the shoe bearing surfaces 34 oil is introduced from a separate source of pressure fluid, not shown, through a tube 52 carried on the longitudinal axis of the cylinder barrel 15 and thence through tube 53 slidably carried within the pistons 29, thence by means of passages 54 drilled into the shoes 32, to the bearing surface 34.

During operation, the hydrostatically lubricated shoe bearings are supplied with oil under pressure sufficient to maintain an adequate film thickness sufficient to support the constant centrifugal load. The intermittent pressure load is carried by squeeze film action. At the ball-socket connection 33 the hydrostatic fluid also serves to compensate about 80% of the centrifugal load on the spherical bearing. The effectiveness of the system of the present invention is immediately observed upon an inspection of Fig. 8 wherein the operating characteristics of different types of shoe bearing surface lubrications are plotted and may be compared.

An analysis of test data obtained during the operation of a machine constructed in accordance with the present invention shows the coefficient of friction on the shoe bearing surfaces 34 to be approximately 0.02 as compared to 0.12 with hydrodynamic lubrication. This reduction of the coefficient of friction causes many advantageous results to be obtained, a principal one being the reduction in the pressure required to stroke the machine from the neutral condition thereof.

The results graphically illustrated in Fig. 8 were obtained from a radial piston machine having a freewheeling reaction ring, and a face-type valving arrangement hydrostatically compensated to balance the thrust on the cylinder barrel.

Without the employment of hydrostatic lubrication on the piston shoes, the shoe bearing surfaces could not stand up under the combined radial loads of centrifugal and hydraulic origin. Also, without the substantial benefits obtained from the use of hydrostatic lubrication, stroking would be difficult, if not impossible, because of the high friction losses in the machine.

As best illustrated in Figs. 1, 2, and 6 a system of passages for transmitting the pressurized fluid to the shoes is disclosed whereby hydrostatic lubrication may be established and the centrifugal load on the shoe may be supported hydrostatically. The pressure load which occurs, when the machine is pumping, is supported by a squeeze or boundary film of fluid. It will be understood that the pressure load is present only during one half of each cycle, as afore-mentioned. The slot or groove 30, as best illustrated in Fig. 7, is employed rather than a recess so that additional surface area will be provided in the event that boundary films occur.

When the machine is under full pressure a hydraulic force is applied to each piston during the discharge portion of the pumping cycle, this force tending to reduce the hydrostatic film thickness. Even under maximum hydraulic load, however, the film thickness is sufficient to prevent actual contact between the shoe and the reaction ring. The pressure due to the hydrostatic film and the maximum pressure distribution are added to one another to result in a combined distribution of pressurized fluid under the shoe. Only the centrifugal load at the piston ball joint is balanced, the centrifugal load being that due to the piston and ball. A positive hold-down force will be provided by replenishing pressure.

Figure 10:
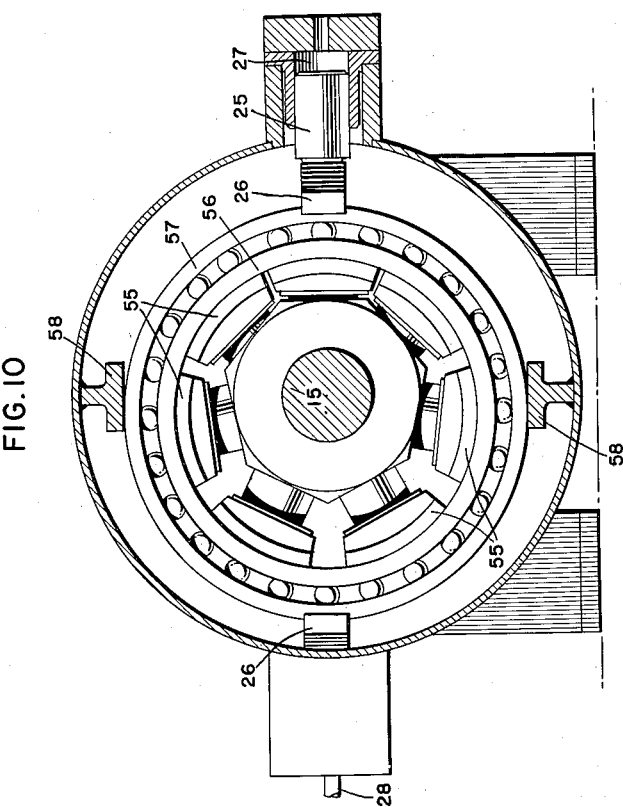
Fig. 10 is a transverse sectional view taken along a line substantially corresponding to line 10—10 of Fig. 9.
Figure 9:
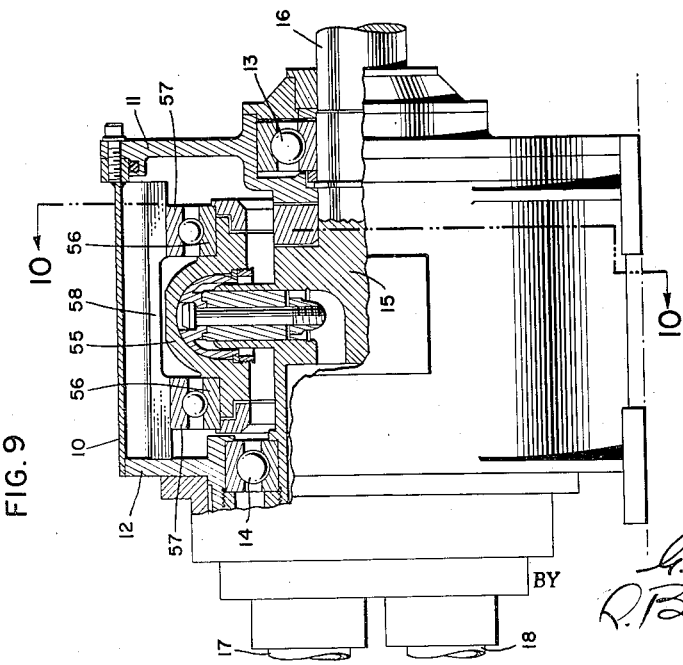
Fig. 9 is a vertical section taken along the center line of the cylinder barrel of a machine constructed in accordance with the second embodiment of the present invention.

A second embodiment of the present invention is disclosed in Figs. 9 and 10 wherein the reaction ring 22 of the first embodiment has been eliminated and the hydrostatically supported shoes 55 bear directly against the inner race 56 of the bearings. The outer bearing race 57 constitutes, in effect, the reaction ring of the second embodiment and is constructed to roll rather than slide in its guides 58.

Referring now to the drawings and particularly to Fig. 11 thereof, wherein another embodiment of the invention is illustrated, it will be noted that a high pressure fluid from some external source enters the cylinder barrel 59 through a conduit 61 which is secured in the cylinder barrel high pressure chamber 62 by means of a rotary joint 63 which may be of any design found suitable for the purpose. The high pressure fluid is fed to each piston pad or shoe 64 by means of a tube 65 slidably retained at one end portion 66 within a bore 67, the latter being concentrically arranged within the piston 68 individual thereto. The other end 69 of each tube 65 is secured within its respective port 71 to thereby provide fluid communication between the high pressure chamber 62 in the cylinder barrel and the concentric bore 67 within each piston. Thus it will be apparent, that the piston is free to reciprocate relative to tube 65. Leakage of hydrostatic lubricating fluid past this tube into the cylinder barrel 59 is negligible.

The outer end of each piston 68 is provided with a concentric substantially hemispherical seat 72 with a recessed reservoir 73 at the bottom thereof. The pad 64 is substantially hemispherical in shape and is constructed of any suitable material for the purpose and in such a manner as to tiltably seat in the hemispherical portion 72 of piston 68. The outer portion of pad 64 is substantially dish-shaped so as to provide an annular protuberance 74 extending around the periphery of the pad and a recessed chamber 75 for high pressure fluid and extending inwardly from the protuberance 74 and concentrically located with respect to the longitudinal axis of the piston 68. The pad 64 is provided with a passage 76 providing fluid communication between high pressure reservoir 73 in the piston and chamber 75 in the pad. The annular protuberance 74 engages the eccentric reacting member 56 and thereby causes reciprocating movement of the piston as the cylinder barrel 59 is rotated relative to the eccentric reacting member. The high pressure fluid performs the dual function of carrying the constant forces such, for example, as centrifugal forces which are present in such a mechanism during operation and also to provide lubrication between the annular protuberance 74 and the reacting member 56. Thus, it will be understood that in addition to bearing the load, the fluid in the chamber 75 also functions to provide a load bearing and lubricating film between protuberance 74 and reacting member 56.

The pads or shoes may be constructed of any material suitable for carrying the large forces involved without exhibiting large frictional forces as the cylinder barrel is rotated relative to the reacting member. Similarly, the hydraulic fluid may be of any suitable type which is capable of carrying large loads and which also possesses good lubricating properties.

The graph illustrated in Fig. 12 was plotted from test data obtained during the operation of a radial piston machine with high radial loads. The machine from which this test data was obtained originally employed mixed hydrodynamic and boundary lubrication at the pads for carrying the radial loads on the pistons. The machine was later modified to incorporate the hydrostatic bearing system of the present invention. Evidence of the success of the system of the present invention is readily apparent by comparison of the curves in Fig. 12. The upper curve indicates the magnitude of friction losses between the pads and the reaction member when mixed hydrodynamic and boundary lubrication is employed. The bottom curve was plotted from test data obtained during operation when the machine was in neutral, that is, in a condition in which there is no relative motion between the pads and the reacting member. Thus, the bottom curve represents the ideal limit which would be approached if there were no friction between the pad and the reacting member. The middle curve was plotted from test data obtained during operation of the machine when the hydrostatic lubrication system of the present invention was employed, and indicates that the present invention enables piston-type positive displacement machinery to be operated very close to the ideal condition. It is believed to be clearly apparent that the present invention provides operating characteristics which are considerably improved over those formerly obtained with such machinery employing the mixed hydrodynamic and boundary lubrication principle.

Obviously many modifications and variations of the present invention are possible in the light of the above teachings. It is therefore to be understood that within the scope of the appended claims the invention may be practiced otherwise than is specifically described.

What is claimed is:

1. Apparatus for providing hydrostatic lubrication in a piston-type positive displacement machine which includes a source of low pressure working fluid, a rotating cylinder barrel and provided with a plurality of radially disposed cylinders, a plurality of pistons operatively arranged within the cylinders and in fluid communication with said source of low pressure fluid, and an eccentric reacting member disposed for effecting reciprocation of the pistons in the cylinder barrel, the apparatus comprising; a pad for each piston and having a hollow spherical portion provided with a pair of bearing surfaces extending outwardly therefrom on opposite sides thereof, said bearing surfaces being disposed between the piston individual thereto and in engagement with the reacting member, each of said spherical portions being provided with a socket, a hollow ball disposed within said spherical portion and slidably disposed over the exterior surface of each cylinder for tiltably carrying said pad on the outer end of its respective piston, a chamber separated and surrounded by said working fluid and containing high pressure lubricating fluid, said chamber being disposed within the cylinder barrel and on the axis of rotation thereof, conveying means connected to said chamber for supplying high pressure lubricating fluid thereto, the interior portions of each of said pistons and pads being concentric with the longitudinal axes thereof and defining a bore, a tubular member slidably retained at one end thereof within said bore and rigidly secured at the other end thereof to said cylinder barrel in fluid communication with said chamber, groove means formed in each of said bearing surfaces, passageways formed in said spherical portions and the bearing surfaces in fluid communication with the groove means and with said chamber by way of said tubular members for supplying high pressure lubricating fluid to the bearing surface of said pad to enable the high pressure lubricating fluid to perform both load supporting and hydrostatic lubricating functions between the bearing surface of the pad and the reaction ring.

2. Apparatus for providing hydrostatic lubrication in piston-type positive displacement pumps which include a source of low pressure working fluid, a rotating cylinder barrel, a plurality of radially disposed cylinders carried by the cylinder barrel, a plurality of pistons operatively arranged within the cylinders, and in fluid communication with the source of low pressure working fluid, and an eccentric reacting member disposed for effecting reciprocation of the pistons in the cylinder barrel to pump the working fluid into a high pressure outlet line, the apparatus comprising; a pad carried by the outer end of each piston for establishing and maintaining a hydrostatic fluid film at the bearing surfaces between the reacting member and each piston, a chamber isolated from the working fluid and disposed within the cylinder barrel on the axis of rotation thereof and containing high pressure lubricating fluid, high pressure lubricating conveying means to said chamber, conduit means within each piston and in fluid communication with said chamber and extending through each pad, a hollow ball connecting member secured to the outer end of each of said pistons and slidably receivable over the exterior surface of each cylinder individual thereto for telescopic movement thereon as said pistons reciprocate, the interior surface of said pads defining a socket for receiving said ball connecting member thereby to be tiltably connected to the piston, each of said pads further defining wing-shaped bearing surfaces in engagement with said reacting ring, lubrication grooves within each of said bearing surfaces and lubricating conduits within said pad and in fluid communication via said conduit means in each piston with said high pressure lubricating fluid chamber within the cylinder barrel for establishing hydrostatic lubrication between the bearing surfaces and the reaction ring.

3. Apparatus for providing hydrostatic lubrication in a piston-type positive displacement machine which includes a source of low pressure working fluid, a rotating cylinder barrel having a plurality of radially disposed cylinders carried thereby, a plurality of pistons operatively arranged within the cylinders, and an eccentric reacting member disposed for effecting reciprocation of the pistons in the cylinders, the apparatus comprising; a pad carried at the end of each piston and having a hollow spherical body provided with a pair of wing-shaped bearing surfaces formed therewith and extending outwardly therefrom and in engagement with said reacting member, a hollow ball secured to the outer end of each piston and disposed within said spherical body for tiltably connecting the pads to the piston, first tubular member coaxially disposed with the axes of the cylinder barrel and the pistons and connected to an external source of high pressure lubricating fluid for maintaining the lubricating fluid independent from the working fluid, a second tubular member carried by said cylindrical barrel and disposed within each of said cylinders and extending centrally through each of the pistons in communication with said first tubular member through which the high pressure lubricating fluid flows into the second tubular member, conduit means in said spherical member and the wing-shaped bearing surfaces in communication with said second tubular member, and groove means in said bearing surfaces in communication with said conduit means for supplying the high pressure lubricating fluid between the bearing surfaces and the reacting member.

References Cited in the file of this patent

UNITED STATES PATENTS

| | | |
|---|---|---|
| 1,073,197 | Westinghouse | Sept. 10, 1913 |
| 1,924,124 | Kuzelewski | Aug. 29, 1933 |
| 2,123,391 | Whitfield | July 12, 1938 |
| 2,599,609 | Carey | June 10, 1952 |
| 2,620,733 | Overbeke | Dec. 9, 1952 |
| 2,679,210 | Muller | May 25, 1954 |
| 2,789,515 | Smith | Apr. 23, 1957 |

FOREIGN PATENTS

| | | |
|---|---|---|
| 246,097 | Germany | July 1, 1909 |